United States Patent [19]

Trumpp et al.

[11] Patent Number: 5,043,724
[45] Date of Patent: Aug. 27, 1991

[54] BROADBAND SIGNAL SWITCHING EQUIPMENT

[75] Inventors: Gerhard Trumpp, Puchheim; Jan Wolkenhauer, Munich, both of Fed. Rep. of Germany

[73] Assignee: Siemens Aktiengesellschaft, Munich, Fed. Rep. of Germany

[21] Appl. No.: 502,573

[22] Filed: Mar. 30, 1990

[30] Foreign Application Priority Data

Mar. 31, 1989 [EP] European Pat. Off. ........ 89105715.0

[51] Int. Cl.⁵ .............................................. H04Q 3/52
[52] U.S. Cl. ..................... 340/825.910; 340/825.89; 379/292; 307/468
[58] Field of Search ..................... 340/825.79, 825.85, 340/825.86, 825.88, 825.89, 825.9, 825.91, 825.93, 825.83, 825.87; 379/291, 292, 306; 307/465, 468, 241; 364/716

[56] References Cited

U.S. PATENT DOCUMENTS

| | | | |
|---|---|---|---|
| 4,467,439 | 8/1984 | Rhodes | 307/465 |
| 4,577,190 | 3/1986 | Law | 340/825.91 |
| 4,745,409 | 5/1988 | Hofmann | 307/241 |
| 4,746,921 | 5/1988 | Hofmann | 340/825.91 |
| 4,785,299 | 11/1988 | Trumpp | 340/825.91 |
| 4,801,936 | 1/1989 | Hofmann | 340/825.91 |
| 4,839,643 | 6/1989 | Koenig et al. | 340/825.91 |
| 4,894,651 | 1/1990 | Trumpp et al. | 340/825.91 |

Primary Examiner—Donald J. Yusko
Assistant Examiner—Edwin C. Holloway, III
Attorney, Agent, or Firm—Hill, Van Santen, Steadman & Simpson

[57] ABSTRACT

A broadband signal switching equipment constructed in field effect transistor technology has gates at the inputs of the switching point matrix, and output drive circuits having threshold values at the outputs of the switching point matrix. The output signal of a connection, which preferably proceeds via a switching point residing in the center of the switching point matrix and which transmits a fixed signal during each bit through connect interval, is used to block the gates on the input side, given a change of the signal condition of the output signal, whereby a further charge reversal of the switching point matrix output lines is avoided.

2 Claims, 3 Drawing Sheets

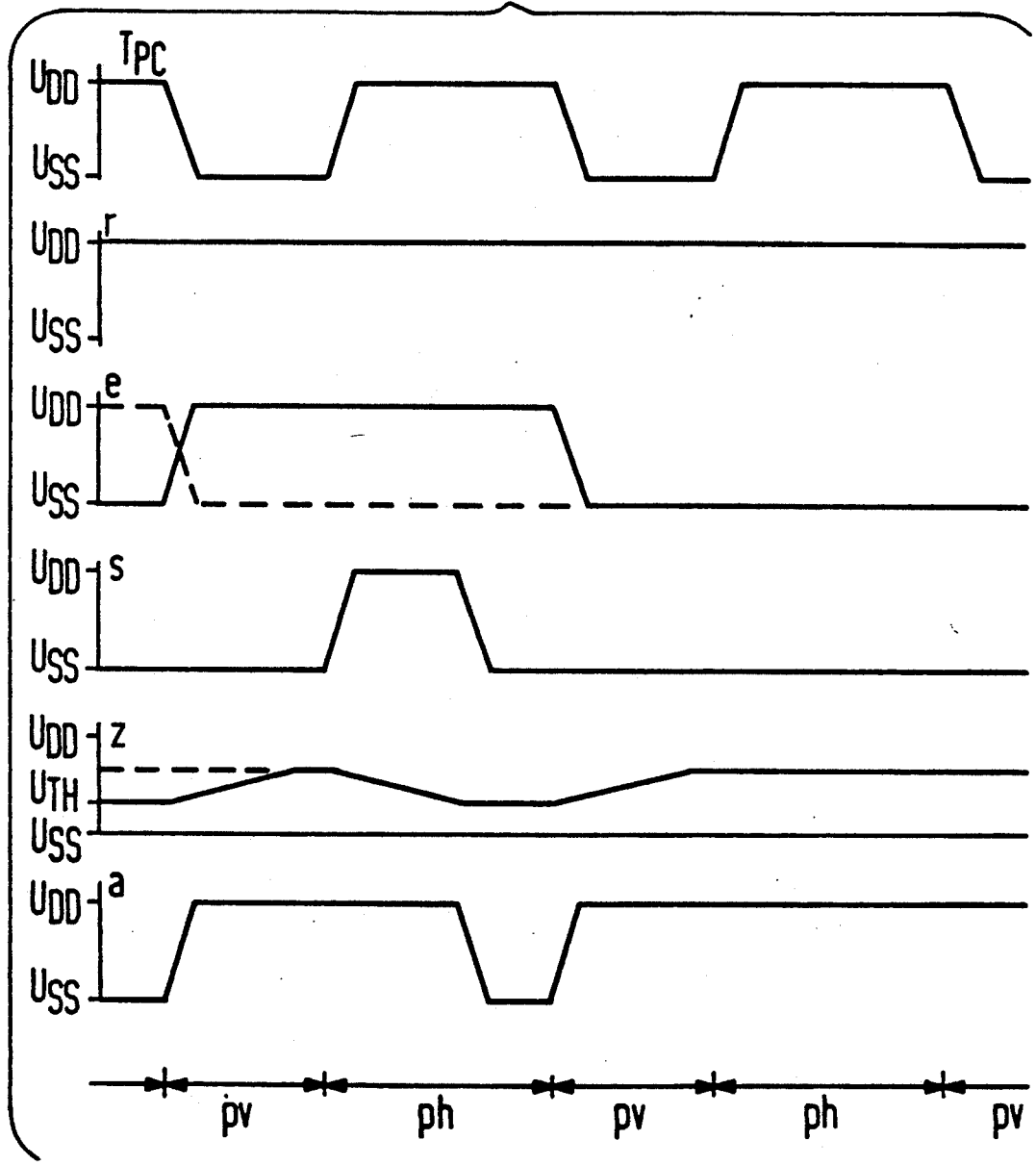

BROADBAND SIGNAL SWITCHING EQUIPMENT

BACKGROUND OF THE INVENTION

1. Field of the Invention

The present invention relates to telecommunication signal switching equipment and is more particularly concerned with broadband signal switching equipment.

2. Description of the Prior Art

Modern developments in telecommunication engineering lead to integrated services message transmission and switching systems for a narrowband communication services and broadband communication services, which provide light waveguides as transmission media in the area of the subscriber lines by way of which narrowband communication services, in particular 64 kbit/s digital telephony, are guided as well as broadband communication services, particularly 140 Mbit/s video telephony, whereby, in the switching stations, also (preferably with joint control units) narrowband signal switching devices and broadband signal switching devices can be provided in a side-by-side manner, as disclosed in the German patent 24 21 002, corresponding to U.S. Pat. No. 3,980,831, fully incorporated herein by this reference.

As is known, for example from the European application 0 262 479, corresponding to U.S. Pat. No. 4,801,936, also fully incorporated herein by this reference, broadband signal switching equipment has a switching point matrix constructed in field effect transistor (FET) technology whose switching elements are composed of, respectively, one switch transistor which is charged, at a control electrode, with a through connect or blocking signal and connected to the appertaining matrix output line with a main electrode, whereby the switching elements respectively have an auxiliary transistor connected in series with the switch transistor, the auxiliary transistor being connected with its control electrode to the appertaining matrix input line, and its main electrode, not facing the serial connection, being connected to the one terminal of the operating voltage source by way of a sampling transistor, the other terminal of the operating voltage source being connected to the respective matrix output line via a precharge transistor, and whereby the precharge transistor and the sampling transistor are charged oppositely respectively at their control electrodes with a selection clock for the switching matrix array dividing a bit switch through interval into a precharge phase and the actual through connect phase, so that in each precharge, given a blocked sampling transistor, the matrix output line is charged, via the precharge transistor, at least approximately to the potential prevailing at the mentioned other terminal of the operating voltage source. This known broadband signal switching equipment, which may have sampling transistors for individual switching elements or sampling transistors for individual matrix input lines or matrix output lines requires, for the selection of the sampling transistors, its own clock pulse lines extending through the switching point matrix causing a corresponding space requirement and a corresponding capacitive stress on the matrix output lines; in order to guarantee sufficient interference protection, clock distribution and couplings between matrix input lines and matrix output lines require sufficiently large signal amplitudes on the matrix output lines which is connected with a relatively high power consumption.

In the European patent application 88 11 2908.4, corresponding to U.S. Ser. No. 390,838, filed Aug. 8, 1989, now abandoned, a broadband signal switching equipment is disclosed which has a crosspoint matrix constructed in FET technology whose inputs can respectively be provided with an input drive circuit, whose outputs are respectively provided with an output amplifier circuit, whose switching elements, respectively controlled by a holding memory cell, are constituted respectively by a serial connection of a switch transistor charged at its control electrode with a through connect or block signal and an input transistor connected, via its control electrode, to the appertaining matrix input line, the serial connection between connected to the appertaining matrix output line with the main electrode of the one transistor facing away from the serial connection, and whereby the matrix output line is connected to a precharge potential source via a precharge circuit, which is connected, with an unlocking input to the clock signal line of a precharge clock signal defining the precharge phase of a bit through connect interval divided in such a precharge phase and rest bit through connect interval, so that the matrix output line is charged to a precharge potential in each precharge phase, has been suggested, which provides a swing limitation of the signal on the output lines of the switching equipment. For that purpose, the main electrode which faces away from the serial connection of the other transistor of each switching element is connected to the one terminal of the operating voltage source via a transistor individually provided for the matrix output line that is connected, at its control electrode, to the output of an amplifier circuit individually provided for the matrix output line; given a signal state alteration at the output of the output amplifier circuit, this transistor is blocked and, by that, a further charge reversal of the output line is avoided with which the signal swing on the output line is limited. This signal swing limitation is, however, still incomplete insofar as, after the transistor that exists exclusively for the matrix output lines is blocked, a charge compensation still takes place between the line (connecting the switching elements leading to this matrix output line to the transistor that exists exclusively for the matrix output line) and the matrix output line, so that the output signal level changes even further.

SUMMARY OF THE INVENTION

The object of the present invention is to solve the problem of specifying a broadband signal switching equipment with swing limitations on the output lines while avoiding the abovementioned disadvantages.

According to the invention, a broadband signal switching equipment is provided which has a switching point matrix constructed in FET technology at whose inputs, respectively, one input drive circuit may be provided and whose outputs are provided with respectively one output drive circuit having a threshold value, whereby, in each precharge phase, the output lines can be charged, via a precharge circuit which is controlled by a precharge clock signal dividing a bit through connect interval in a precharge phase and the actual through connect phase, to a precharge potential lying between the two operating potentials, or to one of the two operating potentials. According to the invention, this broadband signal switching equipment is particularly characterized in that, in the switching equipment, a connection is provided of a matrix input line, charged with a fixed signal, and a matrix output line, the connection being switched through in each bit through connect interval, the signal potential of the matrix output line triggering an output signal when the threshold value of the appertaining output drive circuit is reached at the output thereof, the output drive signal blocking all matrix input lines.

Practice of the present invention provides the advantage of a strict limitation of the signal swing on the output lines. The reduction of the signal swing on the output lines leads to a reduction of the charge reversal losses, which is equivalent to a reduced power consumption. With the reduced power consumption comes a correspondingly-reduced power dissipation which optimally permits an increase of the packing density of the switching elements or of the switching frequency. The reduced power consumption furthermore results in a reduction of disturbances of the operating voltage of the broadband signal switching equipment caused by peak loads. An additional advantage of the signal swing limitation is a reduction of the disadvantageous influences on adjacent signal paths.

As a further embodiment of the invention, it is possible that the connection of a matrix input line, charged with a fixed signal, and a matrix output line, the connection being switched through in a each bit switch through interval, proceeds via a switching point residing approximately in the center of the switching point matrix. This measure enables the greatest possible reduction of effects of deviations due to manufacturing between the matrix lines provided for transmitting the fixed signal and the rest of the matrix lines.

BRIEF DESCRIPTION OF THE DRAWINGS

Other objects, features and advantages of the invention, its organization, construction and operation will be best understood from the following detailed description, taken in conjunction with the accompanying drawings, on which:

FIG. 5 is a graphic illustration of the signal conditions and signal states at various points in the broadband switching equipment.

DESCRIPTION OF THE PREFERRED EMBODIMENTS

Figure 1:
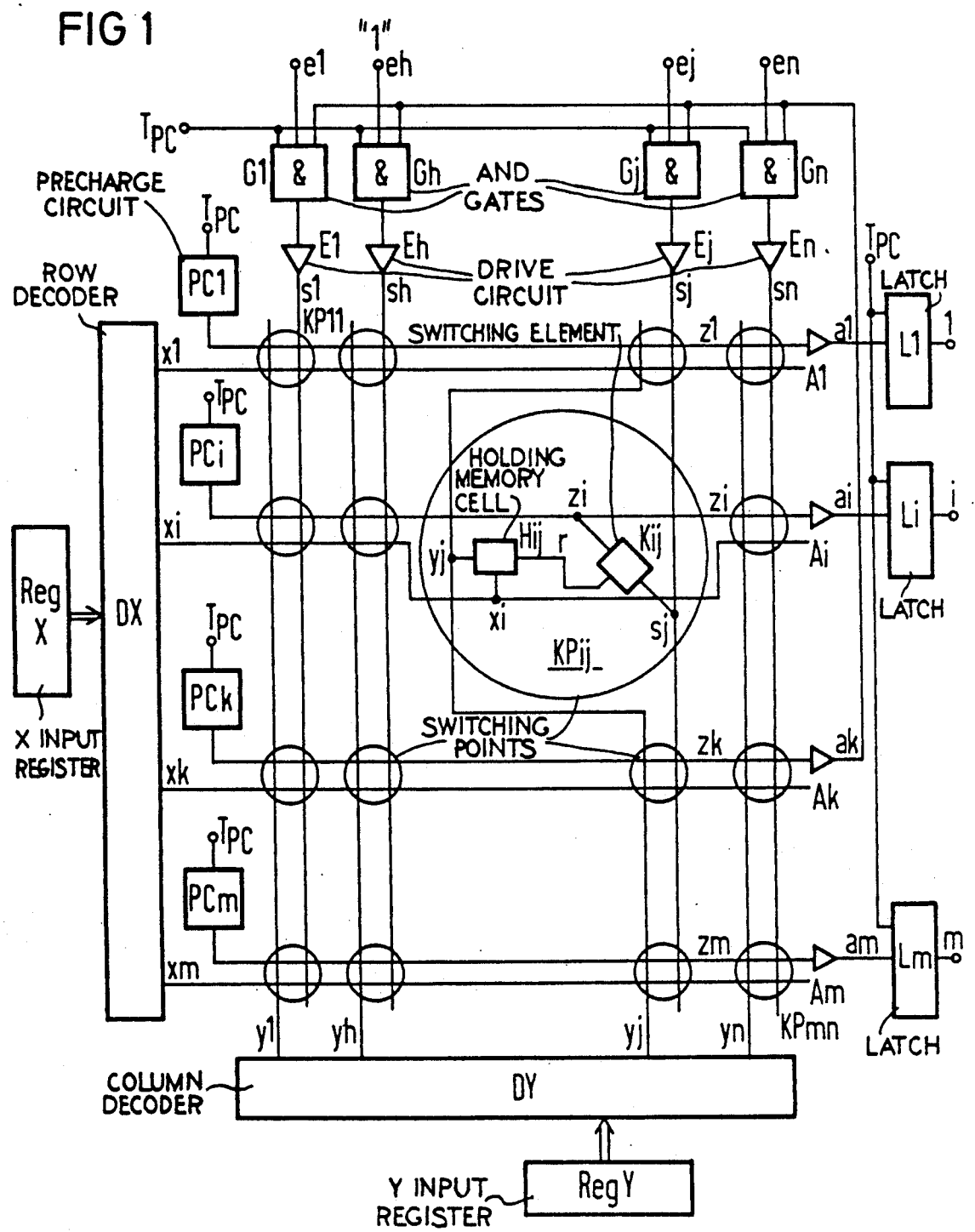
FIG. 1 is a schematic representation of a broadband switching equipment constructed in accordance with the present invention.

FIG. 1 schematically illustrates, to an extent necessary to comprehend the invention, a broadband signal switching equipment at whose inputs e1-en, leading to column lines s1-sn of a switching point matrix and, in the example, provided with input drive circuits E1-En, respectively, an AND gate G1-Gn is provided, and whose outputs a1-am, reached by row lines z1-zm of the switching point matrix, are provided with drive circuits A1-Am having threshold values. The outputs a1-am with the exception of the output ak lead to hold memories (latches) L1-Lm provided for individual rows, which are supplied with a clock signal $T_{pc}$. The hold memories (latches) are sufficiently known in the art and no further description is necessary here. The output ak of a drive circuit Ak preferably arranged in the center of the output drive circuits A1-Am leads to respectively one input of the gates G1-Gn on the matrix input side. By way of further inputs, the gates G1-Gn are supplied with the clock signal $T_{pc}$. Further input lines E1-En of the gates G1-Gn carry the respective input signal, whereby the input eh of a gate Gh preferably arranged in the center of the gates G1-Gn is to be continuously charged with a fixed signal "1". The switching point matrix has precharged circuits PC1-PCm provided for each individual row that are controlled by a clock signal $T_{pc}$.

The switching point matrix has switching points KP11-KPmn whose switching elements, as shown in detail at the switching point KPij for the switching elements Kij, can be controlled by a holding memory cell Hij (at the switching point KPij) which exists for each individual switching point, the output r of the holding memory cell Hij leading to the control input of the respective switching element (Kij at the switching point KPij).

According to FIG. 1, the holding memory cells . . . Hij . . . are selected in two coordinates via two drive decoders, namely a row decoder DX and a column decoder DY, via corresponding selection lines x1-xm and y1-yn.

As can be seen from FIG. 1, the two drive decoders DX, DY are to be chargeable from respective input registers Reg X, Reg Y, with one switching point row, or switching point column address common to a matrix row (row or column) of switching points, in response to which they supply a "1", drive/selection signal at the selection line corresponding to the respective switching point row address. The coincidence of a row selecting signal "1" and of a column selecting signal "1" at the switching point of the respective matrix row/line and the respective matrix column when setting up a corresponding connection then causes an activation of the holding memory cell located thereat, for example the holding memory cell Hij, with the consequence that the switching element, in the example of the switching element Kij, controlled by the respective holding memory cell Hij becomes conductive.

In order for the switching element Kij contemplated in the present example to become blocked again when the respective connection is discontinued, the drive decoder DX is again charged with the respective row address from the input register Reg x, so that the line decoder DX, on its output line xi, again supplied a line selecting signal "1" and, at the same time, the column decoder DY, from its input register Reg Y is charged, e.g. with a blank address or with the address of a column of unconnected switching points, so that it supplies a column selecting signal "0" on its output line yj; the coincidence of the row selecting signal "1" and the column selecting signal "0" that causes the resetting of the holding memory cell Hij with the consequence that the switching element Kij controlled thereby is blocked.

Figure 2:
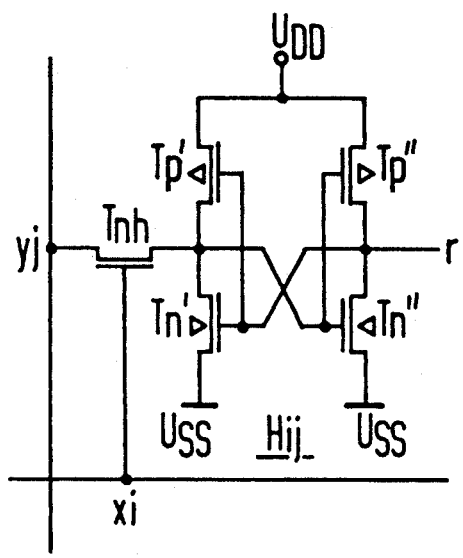
FIGS. 2-4 are detailed circuit diagrams of respective circuit constructions.

The holding memory cells . . . Hij . . . can be fashioned in a the European application 0 238 834, corresponding to U.S. Pat. No. 4,785,299 and fully incorporated herein by this reference, and as shown in FIG. 2, of a n-channel transistor Tnh and two cross-coupled inverter circuits, (complementary metal-oxide-semiconductor (CMOS) inverter circuits) Tp', Tn'; Tp'', Tn'', whereby one inverter circuit is connected on the input side to the appertaining decoder yj of the one drive decoder via the n-channel transistor Tnh, which, in turn, is charged at its control electrode, with the output signal of the appertaining decoder output xi of the other drive decoder, and whereby an inverter circuit, on the output side, leads to the control input r of the appertaining switching element.

Figure 4:
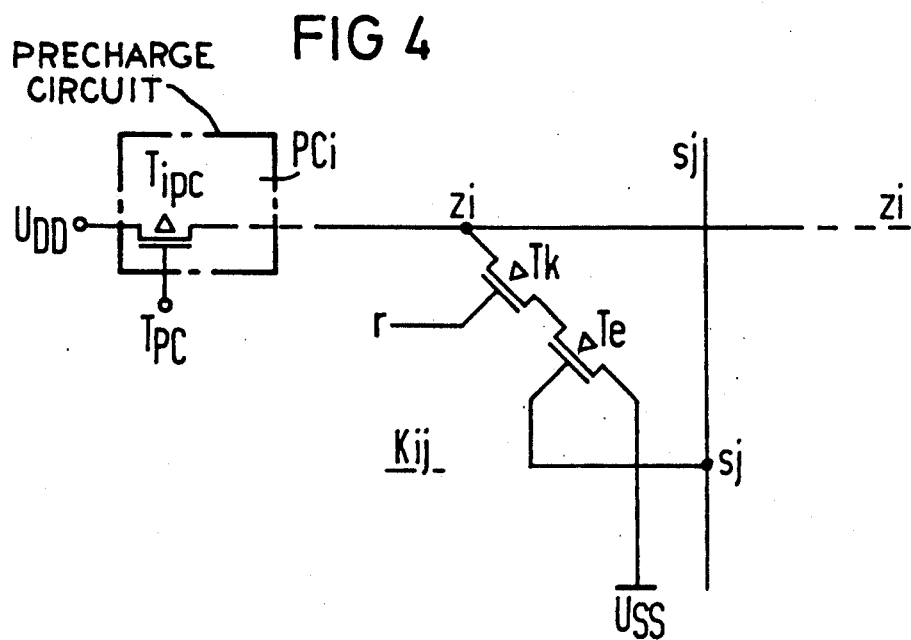

FIG. 4 illustrates the circuit-related realization of the switching elements . . . Kij . . . The switching elements Kij . . . are respectively composed of a serial connection of a switch transistor Tk, charged at its control electrode with a switch through or blocking signal from the holding memory cell, and an input transistor Te, connected to the appertaining matrix input line sj with its control electrode. This serial connection being connected to the appertaining matrix output line zi with the main electrode, not facing the serial connection, of the one transistor Tk.

Via a precharge circuit PC, the matrix output line zi is thereby connected with a precharge potential source from which the matrix output line zi can be charged to a precharge potential lying between the two operating potentials, or even one of the two operating potentials. A precharge potential source for a precharge potential lying between the two operating potentials can be generated, in a basically known fashion (e.g. European patent application 0 249 837, corresponding to U.S. Pat. No. 4,894,651, issued Jan. 16, 1990 and fully incorporated herein by this reference) with a recoupled CMOS inverter by way of which the matrix output line is charged at least approximately to the potential corresponding to the switch threshold of the inverter respectively in a precharge phase of a bit switch through interval. By contrast, in the exemplary embodiment illustrated in FIG. 4, matrix output line zi is connected with the one terminal ($U_{DD}$) of the operating voltage source $U_{DD}$–$U_{ss}$ via a precharge circuit, which, as also shown in FIG. 4, is composed, in a known manner (European application 0 262 479, corresponding to U.S. Pat. No. 4,801,936 and fully incorporated herein by this reference) of a precharge transistor $T_{ipc}$ residing at a precharge clock line $T_{pc}$ with its control electrode.

The main electrode, not facing the serial connection, of the other transistor Te is continuously, i.e. not clock-pulse controlled, connected to the other terminal $U_{ss}$ (ground) of the operating voltage source.

Figure 3:
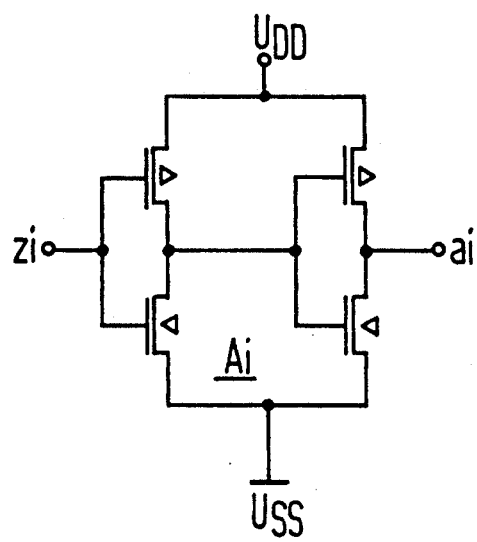

FIG. 3 illustrates how the output drive circuits Al–Am having threshold values can be realized in circuit terms. The output drive circuits Al–Am are constituted by a chain connection of two CMOS inverters, whereby the respective matrix output line (zi) is connected to the control electrodes of the complementary transistor pair operating as a first CMOS inverter, and the connecting point of the main electrodes of the first transistor pair is connected with the control electrodes of the transistor pair operating as a second CMOS inverter. The connection of the two main electrodes of the second transistor pair constitutes the output (ai) of the output drive circuit (Ai). The characteristic switching threshold $U_{TH}$ of such an output drive constituted by CMOS inverters lies approximately at 40% of the operating voltage feeding the output drive circuit Ai. Accordingly, and as shown in FIG. 3, the switching threshold $U_{TH}$ for the output drive circuit Ai lies at approximately 2 V for an operating voltage $U_{DD}$–$U_{ss}$ of 5 V.

A corresponding precharge clock signal $T_{pc}$ charging the control electrode of reach precharge transistor ($T_{ipc}$ in FIG. 4) causes that, in each precharge phase pv (bottom of FIG. 5) of a bit-period divided, by the precharge clock signal, into such a precharge phase pv and a subsequent main phase (ph in FIG. 5), each precharge transistor ($T_{ipc}$) is conductive, so that during the preload phase pv the matrix output lines zl–zm are charged via the respective precharge transistor to a precharge potential lying between the two operating potentials, or even to one of the two operating potentials. Such a precharge clock signal suitable in the exemplary embodiment according to FIG. 4 is shown in FIG. 5 in the line $T_{pc}$.

In the subsequent main phase ph (see bottom of FIG. 5) the precharge transistors $T_{ipc}$ (FIG. 4) are blocked, in the example via a "HIGH" precharge clock signal $T_{pc}$ (line $T_{pc}$ of FIG. 5); simultaneously, the gates Gl–Gn on the matrix input side are unblocked. If the switch transistor Tk (FIG. 4) of a switching element Kij is conductive due to a (in the example "HIGH") through connect signal (line r of FIG. 5) residing/waiting at the control input r, and is thereby the switching point in the through connect condition, the matrix output line (row line) zl–zm connected to this matrix input line (column line) Sl–Sn via the respective switching element will be discharged depending on the signal condition corresponding to the bit to be switched through and prevailing on the respective matrix input line (column line) Sl–Sn, or it will remain on the operational potential accepted in the precharge phase pv. If the potential of the matrix output line zl–zm reaches the threshold value of the respective output drive circuit Al–Am, as set forth for example in FIG. 5, row z with the potential $U_{TH}$, a steep signal condition change occurs on the appertaining output line a (FIG. 5, line a).

A signal condition present on the respective matrix input line is thereby switched through in inverted form via the respective switching point unblocked from its control input r.

In the case of the switching point matrix constructed in accordance with the present invention, a matrix input line (in the example sh in FIG. 1) and a matrix output line (in the example zk of FIG. 1) are provided, by way of which a fixed signal (in the example a "HIGH" signal) is transmitted in each bit through connect interval. If the potential of the matrix output line zk thereby reaches the threshold value of the output drive circuit Ak, as set forth for example in FIG. 5, row z with the potential $U_{TH}$, a steep signal condition change occurs on the appertaining output line ak (FIG. 5, row a). According to the invention, the output signal of the fixed signal connection eh-sh-KPkh-zk-ak, transmitting the fixed signal during each bit through connect interval, is used to block the gates Gl–Gn and thus to terminate further discharging of the respective matrix output lines via the switched-through switching points, whereby the signal swing on the respective matrix output lines zl–zm is limited.

FIG. 5 shows, for two successive bit through connect intervals, the transmission of a "HIGH" signal and, subsequently, of a "LOW" signal (see row e) e.g. from an input ej (FIG. 1) to an output ai (FIG. 1) of the switching point matrix illustrated in FIG. 1.

In the precharge phase pv of the bit through connect interval divided into the precharge phase pv and the main phase ph, as set forth above, all matrix output lines zl–zm are precharged (FIG. 5, row z); in the subsequent main phase ph, the gates (Gl–Gn in FIG. 1) on the matrix input side are unblocked so that the "HIGH" signal waiting at the input ej (FIG. 5, row e) is switched through to the appertaining matrix input line sj, whereby the input transistor Te (FIG. 4) of the contemplated switching point KPij (FIG. 1) is switched conductive. The switch transistor Tk (FIG. 4) is to be brought into the throughconnect condition via a (in the present example "HIGH") control signal r (FIG. 5, line r); and the respective matrix output line zi is then discharged to ground via the transistors Tk and Te (FIG. 4) as shown in FIG. 5, row z.

On the fixed signal connection eh-sh-KPkh-zk-ak (FIG. 1), which transmits a "HIGH" signal in each bit through connect interval, simultaneously the same event takes place in basically the same fashion. If the signal level on the matrix output line zk of the fixed signal connection thereby reaches the threshold value $U_{TH}$ of the output drive circuit Ak (see FIG. 5, row z) a steep signal condition change occurs at the output ak of the output drive circuit ak (see FIG. 5, line a). The output signal ak of the output drive circuit ak blocks all gates (Gl–Gn of FIG. 1) on the matrix input side. Therefore, the priorly-contemplated matrix input line sj changes into the "LOW" condition (see FIG. 5, line s) so that the input transistor Te of the switching point (FIG. 4) is blocked and the output line is no longer discharged (FIG. 5, line z). At the end of the main phase ph, the "LOW" signal waiting at the output ai of the output drive circuit Ai (see FIG. 5, line a) is taken over in the appertaining holding memory or latch Li, for example with the signal change from a "HIGH" condition into the "LOW" condition of the precharge clock signal $T_{pc}$.

In the subsequent bit through connect interval, as seen in FIG. 5, a "LOW" signal is to be transmitted via the contemplated input line ej. In the precharge phase pv, first all matrix output lines zl–zm are precharged again. In the subsequent main phase ph, the switching transistor Tk in the contemplated switching point (see FIG. 4) is to be in the through connect condition again, due to a (in the example "HIGH") control signal r (see FIG. 5, line r). Since, at the input line ej, a "LOW" signal is waiting, (see line e in FIG. 5), the appertaining matrix input line sj also remains in the "LOW" condition with the consequence that the input transistor Te in the contemplated switching point (FIG. 4) remains blocked, the appertaining matrix output line zi is not discharged and the signal condition on the contemplated output line remains (see FIG. 5, line a); therefore, towards the end of the main phase ph, a "HIGH" signal is taken over into the holding memory Li.

As also shown in FIG. 5, line s, towards the end of a main phase ph, all matrix input lines have performed either two opposite signal transitions or no signal transition at all, so that disturbances on the matrix input lines caused by such signal transitions could eliminate such counterbalance each other and no longer have a disturbing effect on the signal transition in the subsequent holding memory (latch) that takes place toward the end of the main phase ph.

Although we have described our invention by reference to particular illustrative embodiments thereof, many changes and modifications of the invention may become apparent to those skilled in the art without departing from the spirit and scope of the invention. We therefore intend to include within the patent warranted hereon all such changes and modifications as may reasonably and properly be included within the scope of our contribution to the art.

We claim:

1. In broadband signal switching equipment of the type having a switching point matrix constructed with field-effect transistors in accordance with field-effect transistor technology, at whose matrix input lines respectively an input gate and an input drive circuit are connected in series therewith and whose matrix output lines are each provided with and connected to a respective output drive circuit having a threshold value, in which a precharge circuit, which is controlled with a precharge clock signal dividing a bit through connecting interval into a preload phase and a through-connect phase can charge the output lines in each preload phase to a preload potential lying between two operating potentials or to one of the two operating potentials, the improvement comprising:

first means in the switching equipment for providing a through-connection of a matrix input line, charged with a fixed potential, to a matrix output line during each bit through-connect interval; and second means in the appertaining drive output circuit responsive to the signal potential of the connected matrix output line connected thereto for triggering an output signal when the threshold value of the appertaining output drive circuit is reached, and which is connected to the input gates so that the output signal blocks all matrix input lines.

2. The improved broadband signal switching equipment of claim 1, wherein the improvement is further defined as comprising:

said first means for establishing the switch-through connection via a switching point resides approximately in the center of the switching point matrix.

* * * * *